(12) United States Patent
Brudos (10) Patent No.: US 7,373,183 B2
(45) Date of Patent: May 13, 2008

(54) MOBILE TELECOMMUNICATIONS DEVICE WITH CIGARETTE LIGHTER

(76) Inventor: Jeff Brudos, 125 E. Main, #301, American Fork, UT (US) 84003

( * ) Notice: Subject to any disclaimer, the term of this patent is extended or adjusted under 35 U.S.C. 154(b) by 546 days.

(21) Appl. No.: 10/883,571

(22) Filed: Jul. 1, 2004

(65) Prior Publication Data
US 2005/0032482 A1 Feb. 10, 2005

Related U.S. Application Data

(60) Provisional application No. 60/484,187, filed on Jul. 1, 2003.

(51) Int. Cl.
*H04B 7/00* (2006.01)
*H04B 1/38* (2006.01)
*H04M 1/00* (2006.01)

(52) U.S. Cl. ............... 455/572; 455/66.1; 455/90.3; 455/575.1

(58) Field of Classification Search ............... 455/90.1, 455/90.3, 66.1, 344, 550.1, 556.1, 575.1
See application file for complete search history.

(56) References Cited

U.S. PATENT DOCUMENTS

| 3,179,891 | A | 4/1965 | Sharma |
| 5,040,241 | A | 8/1991 | Davison |
| 5,774,793 | A * | 6/1998 | Cooper et al. ............... 455/418 |
| 6,540,506 | B1 | 4/2003 | Li |
| 6,975,202 | B1 * | 12/2005 | Rodriguez et al. ......... 340/5.25 |

* cited by examiner

*Primary Examiner*—Duc M. Nguyen
*Assistant Examiner*—Michael Thier
(74) *Attorney, Agent, or Firm*—Morriss O'Bryant Compagni (57) ABSTRACT

A mobile communications device is provided with an integrally associated ignitor device for enabling the use of the device to light flammable items, such as cigarettes. The combined communications device and ignitor device facilitate the ready availability of an ignitor device for lighting smokable items or for igniting emergency flammable items, such as flares or kindling.

18 Claims, 5 Drawing Sheets

MOBILE TELECOMMUNICATIONS DEVICE WITH CIGARETTE LIGHTER

CROSS-REFERENCE TO RELATED APPLICATION

This is a non-provisional application claiming priority to provisional application Ser. No. 60/484,187 filed Jul. 1, 2003.

BACKGROUND OF THE INVENTION

1. Field of the Invention

This invention relates to mobile communications devices, such as mobile telephones or PDAs, and specifically relates to the combination of a mobile communications device with a cigarette lighter device to facilitate ready location of an ignition device for igniting a smokable or flammable item.

2. Description of Related Art

In the current age, mobile communications devices, particularly mobile telephones, are ubiquitous. In many parts of the world, many people are seldom without them, carrying them on their belts, in their purses, pockets, automobiles, or any other number of readily handy places. Because they are constantly in communication with others, either for business or personal reasons, people tend to be cognizant of their mobile telephones and tend to always know where they are and keep them available.

In contrast, people who smoke constantly misplace their cigarette lighters or other devices they use for lighting their cigarettes. As a result, smokers are constantly searching for a "light." At the same time, however, smokers presumably use mobile telephones or other communications devices with the same frequency as non-smokers, or as the population at large. Thus, many smokers will generally be able to locate their mobile telephones even when they cannot find their lighters or other igniting device.

As a consequence, it would be an improvement on the existing technology to combine a cigarette lighter with a mobile communications device to create one unit that serves multiple functions. This would allow smokers who carry mobile telephones or other communications devices to always be in possession of a means to light their cigarettes. Even if a smoker was not in possession of a mobile communications device with a cigarette lighter function, he or she could probably obtain a "light" from another person having a mobile communications device with such a function.

A mobile communications device with a cigarette lighter function provides a benefit not only to smokers, but also to hikers and other individuals who may find themselves lost or stranded in a cold or otherwise hostile environment and in need of a source of flame to build a fire. Once again, people are frequently caught in such situations without matches or other fire-starting materials, but would more likely have their mobile phones. While having a mobile phone in such dire circumstances would usually allow a stranded person to call for help, the ready availability of an ignition device would allow the person to build a fire until help arrived. Furthermore, hikers, and even motorists, can frequently find themselves lost or stranded in an area that lacks communications frequency transmission, and having access to a lighter may provide the very chance for survival.

Thus, it would be an advantage in the art, for the reasons stated previously, to provide a mobile communications device with an integrally formed or attached ignition device for producing a heat source that may be used to ignite flammable items, such as cigarettes or kindling.

BRIEF SUMMARY OF THE INVENTION

In accordance with the present invention, a mobile communications device is structured with an ignition source for providing a heat source to ignite a flammable element. The invention is described herein with respect to a mobile telephone; however, other forms of mobile communications devices, such as personal digital assistants (PDAs) or wireless PC and telephonic communications devices, such as a Blackberry®, may be combined with an ignition device in accordance with the present invention.

The present invention generally comprises a mobile (e.g., wireless) communications device structurally combined with an ignition mechanism providing a heat source sufficient to ignite a flammable element. The mobile communications device comprises a housing which contains suitable electronic hardware and software for providing desired modes of communication. In conjunction therewith, the housing is structured to provide or contain those structural members that enable use of the communications device, including typically a display screen, keypad, keyboard, function buttons, receiver, voice amplifier, microphone and combinations of such items. The communications device may also include hardware and software for providing numerous other user capabilities, such as capturing and sending photographic images via wireless communication and accessing commercial radio waves.

The housing of the communications device also provides structure for associating an ignition device with the communications elements of the present invention. The ignition device may, in a preferred embodiment, be positioned, at least in part, within the housing. In an alternative embodiment, the ignition device may be integrally supported by the housing such that, for example, the ignition device is detachably attached to the housing.

The ignition device, in accordance with the present invention, may be structured in any suitable manner to provide a source of heat sufficient to ignite a flammable element. For example, the ignition device may comprise a flame that is fueled by an appropriate gas in a fashion similar to a conventional butane lighter. Accordingly, the ignition device may comprise a fuel reservoir that is positioned within the housing of the communications device. The fuel reservoir may include a wick or other means for delivering fuel to the point of ignition. A gas-igniting member is positioned to ignite the gas to produce a flame. The gas-igniting member may be a friction mechanism, such a conventional rotatable wheel that contacts a flint. Alternatively, the gas-igniting member may be a piezoelectrical sparking device of conventional and known structure. Any other suitable gas-igniting member may also be employed.

When a fuel reservoir is used, the reservoir may be either one which is permanently built into the housing and is refillable through a valved opening in the housing, as is known in conventional refillable butane lighters. Alternatively, the fuel reservoir and associated gas-igniting assembly may be removable and replaceable. In either case, it is necessary that the fuel reservoir be unbreakable and leak proof. Other conventional devices may be associated with the gas-fueled structure of the ignition device, such as a selectively adjustable regulator valve that enables the user to regulate fuel flow and thus regulate the magnitude of the flame.

Alternatively to a gas-fueled structure, the ignition device of the invention may comprise a heating element, similar to those conventionally known and installed in vehicles. The alternative ignition device thus comprises a heating element sized to fit conveniently within the housing, and is enabled in any suitable manner by the user to cause the heating element to become hot, thereby providing a heat source for igniting a flammable element. Any number of means may be employed to initiate heating of the element, including by way of example only, a depressible starter button positioned on the housing, which closes an electrical circuit to initiate heating of the element, or a software-programmed or voice command that initiates the mechanical closing of an electrical circuit to initiate heating of the element. It is further within the scope of the invention that the heating element of the device may be detachable from the communications device to provide ignition remotely from the communications device.

Regardless of the type of igniting device that is employed, the housing is structured with a heat shield plate that is positioned about the heat source to protect the housing, and the electronic systems within the housing, from overheating and becoming damaged. Further, the present invention is preferably structured with safety mechanisms that either prevent access to the heat source and/or selectively disable the heat source during times of unintended use. As used herein "unintended use" means operation of the ignitor device by unauthorized persons, such as young children, and during periods of time when an authorized person does not wish to use the ignitor device. It is not meant to imply that the ignitor device is otherwise not usable concurrently with the use of the communications device. The safety mechanism may preferably include a movable cover that is openable to expose the heat source of the ignition device, and is then closable to enclose the heat source of the ignition device while not in use.

The invention is also preferably structured with a locking mechanism that, for example, prevents the cover from opening while not in use and which prevents children from opening the cover to tamper with the ignition device. Any suitable means, both mechanism and/or electrical (including using programmable software commands), may be used to provide the safety mechanism or locking mechanism of the invention.

These and additional features of the mobile communications and ignition device of the present invention are better understood with reference to the drawings and detailed description that follow.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
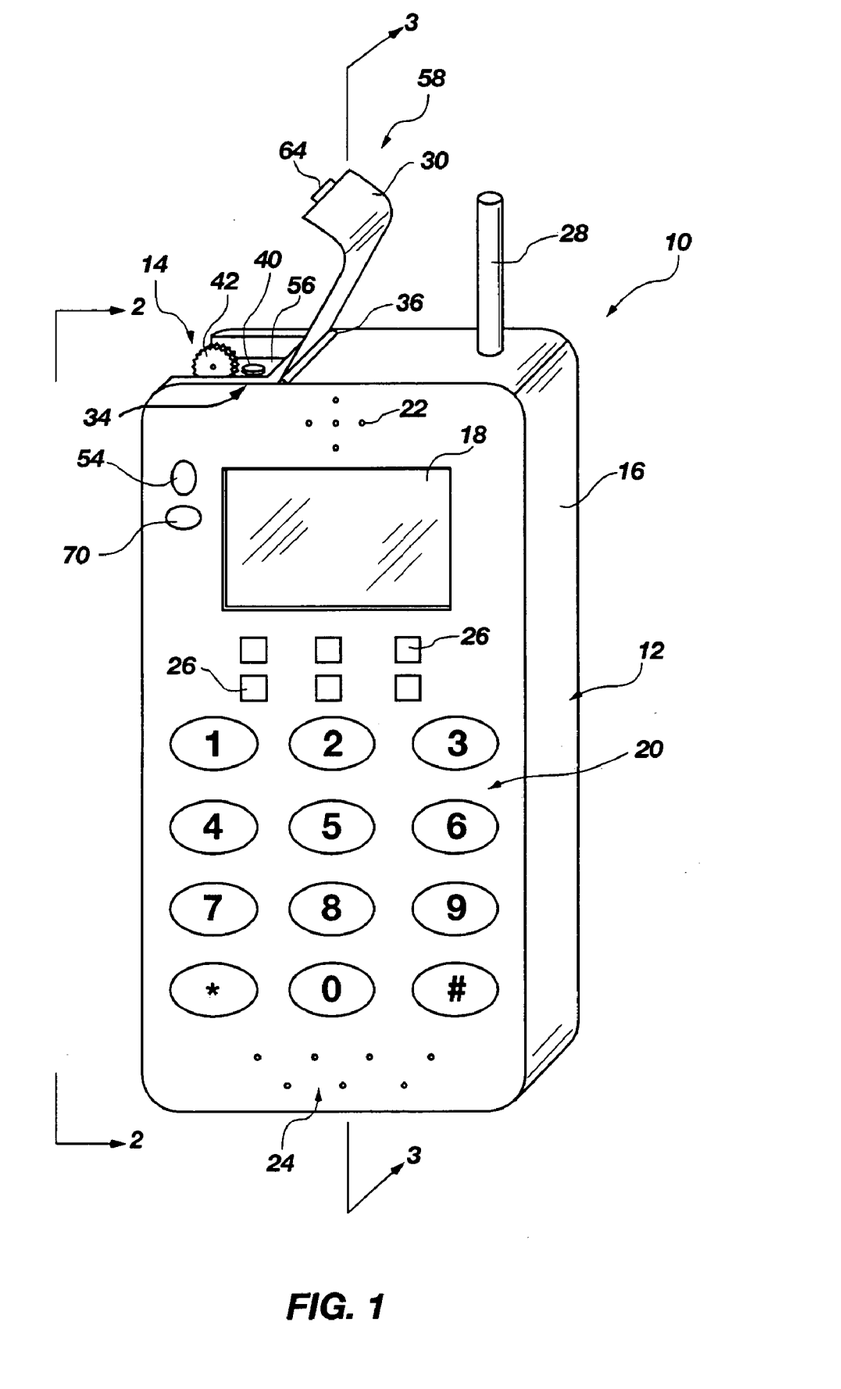
FIG. 1 is a perspective view of a first embodiment of the present invention, structured with a fueled ignition device.

FIG. 1 depicts the principal elements of the mobile communications-ignition device 10 of the present invention, which includes a communications device 12, here depicted as a mobile or wireless telephone, and an ignition device 14. The invention 10 includes a housing 16 which encloses the conventional hardware, software and electronics of the communications device 12. The housing also provides a full or partial enclosure for the ignition elements of the ignition device 14.

The housing 16 may provide for the conventional structures of the communications device 12, here including a display screen 18, a keypad 20, a receiver 22 for hearing transmitted telephone signals, a microphone 24 for sending voice signals, various ancillary function keys 26 and an optional extending and/or extendable antenna 28. The structural elements shown do not constitute an exhaustive list of such elements or functions of the communications device, but only present an exemplary group of conventional elements.

Figures 2, 3:
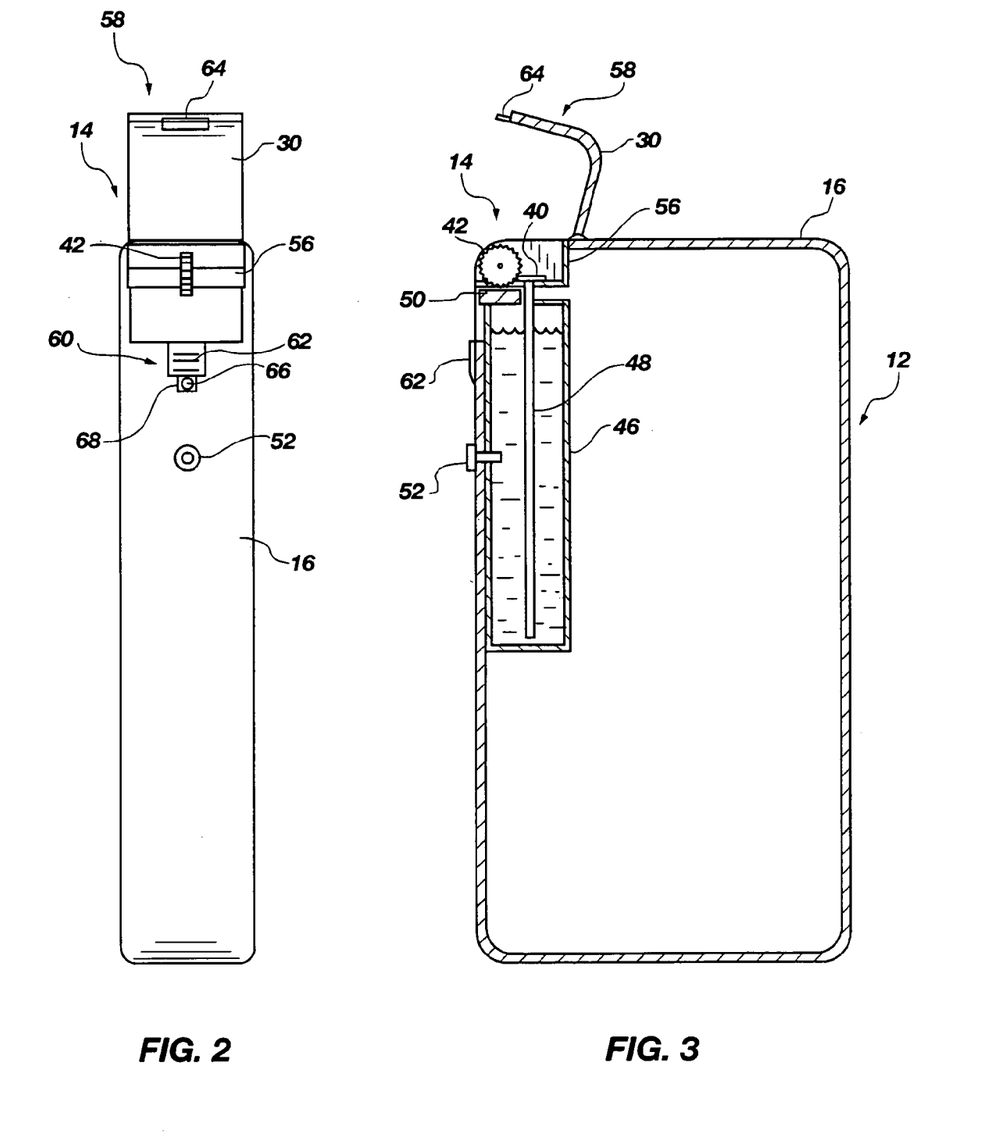
FIG. 2 is a side view of the embodiment of the invention shown in FIG. 1, taken at line 2-2.
FIG. 3 is a view in longitudinal cross section taken at line 3-3 of FIG. 1.

The ignition device 14, in a first embodiment depicted in FIGS. 1-3, comprises a gas-fueled system of the type conventionally known for butane lighters. Further, the embodiment of the invention depicted in FIGS. 1-3 is of a type having a friction element for igniting the fuel. Thus, referring to FIGS. 1 and 2, it can be seen that the housing 16 is structured with a safety mechanism in the form of a movable cover 30 which is generally structured in such a fashion that the cover 30 may be moved relative to the housing 16 to expose the heat source 34 of the ignition device 14. In but one exemplary configuration, the cover 30 is shown in FIG. 1 as being rotatable about a pivot pin 36. The cover 30 may also be configured to slide in a linear track or move in any other appropriate manner.

When the cover 30 is in the open position as shown, the opening 40 is exposed through which gas is expelled to form the flame, or heat source 32. Also, the rotating friction wheel 42 is positioned for access so that the user may rotate the friction wheel 42 to initiate the burning of the fuel as is well known and practiced with conventional butane lighters.

FIG. 3 depicts more clearly in cross section the ignition elements of the ignition device 12 of the first embodiment. A fuel reservoir 46 is housed within the housing 16 of the communications device 12. It should be noted that all other electronics and hardware associated with the communications device 12 are removed for ease of explanation, but are well known in the art and do not require explanation or depiction here. The fuel reservoir 46 is sized to be received in the housing 16 and to retain a selected amount of fuel, such as, for example, butane. The elements of a butane lighter are well-known in the art and only the principle elements are described herein.

A wick 48 is positioned within the fuel reservoir 46 and extends to the opening 40 to deliver fuel for igniting. Near the opening 40 is a rotatable friction wheel 42. The friction wheel 42 is also positioned in proximity to a flint 50 such that as the friction wheel 42 is spun, it interacts with the flint 50 to cause a spark which ignites the fuel emerging through the opening 40. The invention 10 may preferably include an adjustment member 54 (FIG. 1) which is operable to selectively regulate the fuel flow to the opening 40, as is well known in the art.

It should be noted that the ignition device 14 illustrated in FIGS. 2 and 3 is also of the type which is permanently secured within the housing 16, but is refillable through a valve 52 which emerges through the housing 16. It can also best be seen in FIGS. 2 and 3 that the invention is structured with a heat tolerant or heat resistant plate 56 which lies in proximity to the heat source 32, such as a flame. The heat plate 56 keeps the heat source 32 from overheating or igniting the housing or hardware of the communications device.

As previously noted, the mobile communications and ignitor device of the present invention is preferably structured with a safety mechanism that is selectively operable to prevent unintended ignition of the heat source 32, such as by a child or during certain times of use of the communications device. The safety mechanism may be structured or configured in any suitable manner that prevents ignition of the heat source and/or prevents access to the heat source during periods of unintended use. One exemplar safety mechanism 58 is shown in FIGS. 1-3 which comprises a movable cover 30 that encloses the heat source 32 and some of the ignition elements (e.g., friction wheel 42 or starter buttons described further herein).

The invention may preferably include a locking mechanism 60 that can be selectively enabled and disabled to enable or disable the safety mechanism 58 or another element contributing to the production of the heat source 32. Thus, for example, as best shown in FIG. 2, the locking mechanism 60 may comprise a latch mechanism further comprising a slidable button 62 positioned on the housing 16 which is structured to engage a tab 64 connected to the cover 30. Thus, when the cover 30 is in a closed position, the tab 64 is engaged by the button 62, and when the button 62 is slid in a direction away from the cover, the tab 64 is released thereby allowing for the opening of the cover 30. The cover may be manually openable or may be spring-loaded.

The locking mechanism may further be structured to lock in a secure fashion that requires an additional unlocking feature for security purposes. The additional security locking feature may be any type of mechanical and/or electrical device that provides an additional requirement for disabling the locking mechanism 60. In a most simplistic fashion, the additional security locking feature may, for example, comprise a depressible button 66 that is positioned within a recess 68 that the locking mechanism button 62 is slidably disposed in. Thus, in order to disable the locking mechanism 60 the depressible button 66 must be moved inwardly, such as by depression of a key 70 on the housing (FIG. 1), to allow the button 62 to slide within the recess 68.

Alternatively, the depressible button 66, or some other mechanically obstructive device which effectively enables the locking mechanism, may be activated to release or disable the locking mechanism by the input of a pre-programmed code using the keypad 20 of the communications device 12, or by a programmed voice command relayed through the microphone 24 of the communications device 12. Consequently, it would require a unique and unknown code to disable the security locking feature and access the ignitor device 14. It is preferred that if the security locking feature is operable by a pre-programmed code or voice command that the security locking feature also be provided with a manual override device that allows emergency use of the ignitor device 14 should the communications device become inoperable, thereby preventing use of the code or voice command to disable the locking feature.

Figure 4:
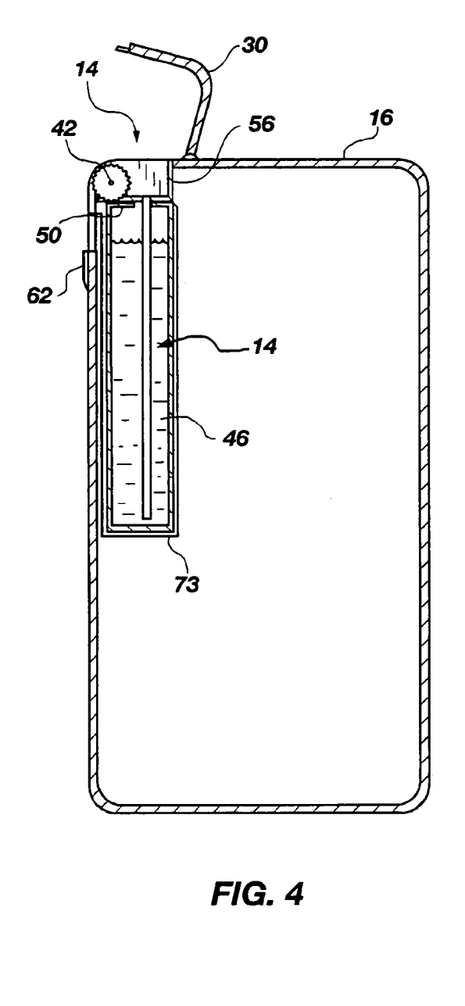
FIG. 4 is a view in longitudinal cross section of a second embodiment of the invention.

As previously noted, FIGS. 1-3 illustrate a first embodiment of the invention where the ignition elements of the ignitor device 14 are permanently housed within the housing 16. FIG. 4 illustrates a second alternative embodiment where the ignition elements of the ignitor device 14 are removable and replaceable with a new ignitor device 14. In such an embodiment, the safety mechanism, here shown as cover 30, is moved to a position away from the ignitor device 14 and the heat plate 56 is removed from the housing 16 to provide an enlarged opening in the housing 16 through which the ignitor device 14 can be removed. It can be seen that in this embodiment, the housing 16 may be especially formed with a chamber 73 particularly sized and shaped for receiving the ignitor device 14. It may be preferable to configure the chamber 73 in such a fashion that the replacement ignitor device 14 cannot be inserted incorrectly. It will be clear to one of skill in the art what ignition elements would removable and replaceable, but typically those ignition elements would include the fuel reservoir 46, friction wheel 42 and flint 50.

Figure 5:
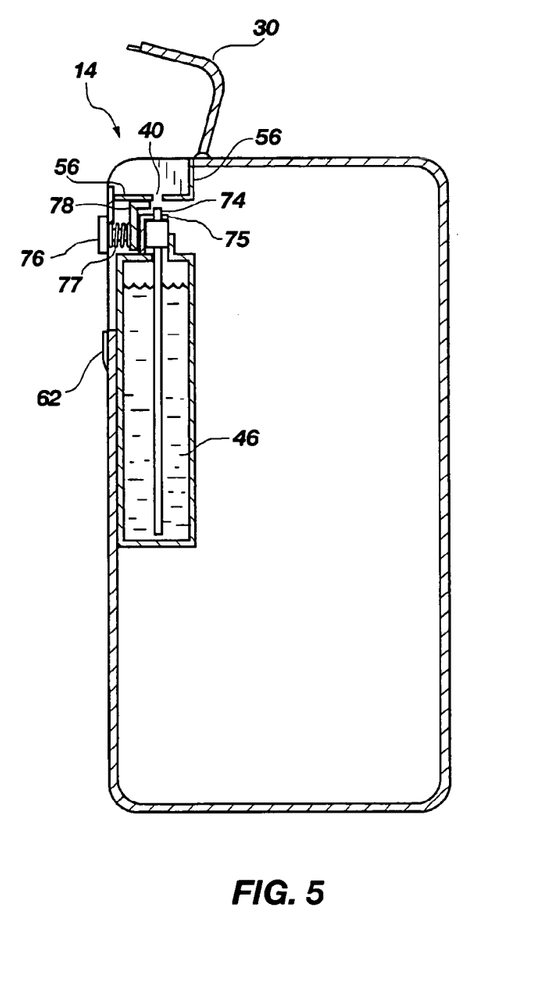
FIG. 5 is a view in longitudinal cross section of a third alternative embodiment of the invention.

FIG. 5 illustrates a third alternative embodiment of the invention where the ignitor device 12 includes a fuel reservoir 46, but alternatively provides an electric sparking element for igniting the fumes from the fuel reservoir 46 near the opening 40. The electric sparking element may be structured in any suitable manner. FIG. 5 illustrates one well-known electric sparking element comprising a piezoelectric mechanism, which is depicted representationally.

In the embodiment shown in FIG. 5, the fuel reservoir 16 is further structured with a nozzle 74 that emits gas fumes. An actuation arm 75 is positioned in proximity to the nozzle 74 to release fumes from the nozzle 74. The actuation arm 75 is connected to a starter button 76 that is biased by a spring 77. A piezoelectric element 78 is positioned in proximity to the nozzle 74 and may be co-activated by the starter button 76. In known fashion, when the starter button 76 is depressed, the actuation arm 75 releases gas from the nozzle 74 and simultaneously the piezoelectric element 78 is struck in a manner that causes an electric spark to be produced in proximity to the emittance of the gas fumes, thereby producing a flame that emerges from the opening 40. As further illustrated in FIG. 5, the starter button 76 and opening 40 are positioned for enclosure by the safety mechanism or cover 30 for the reasons previously described.

Figures 6, 7:
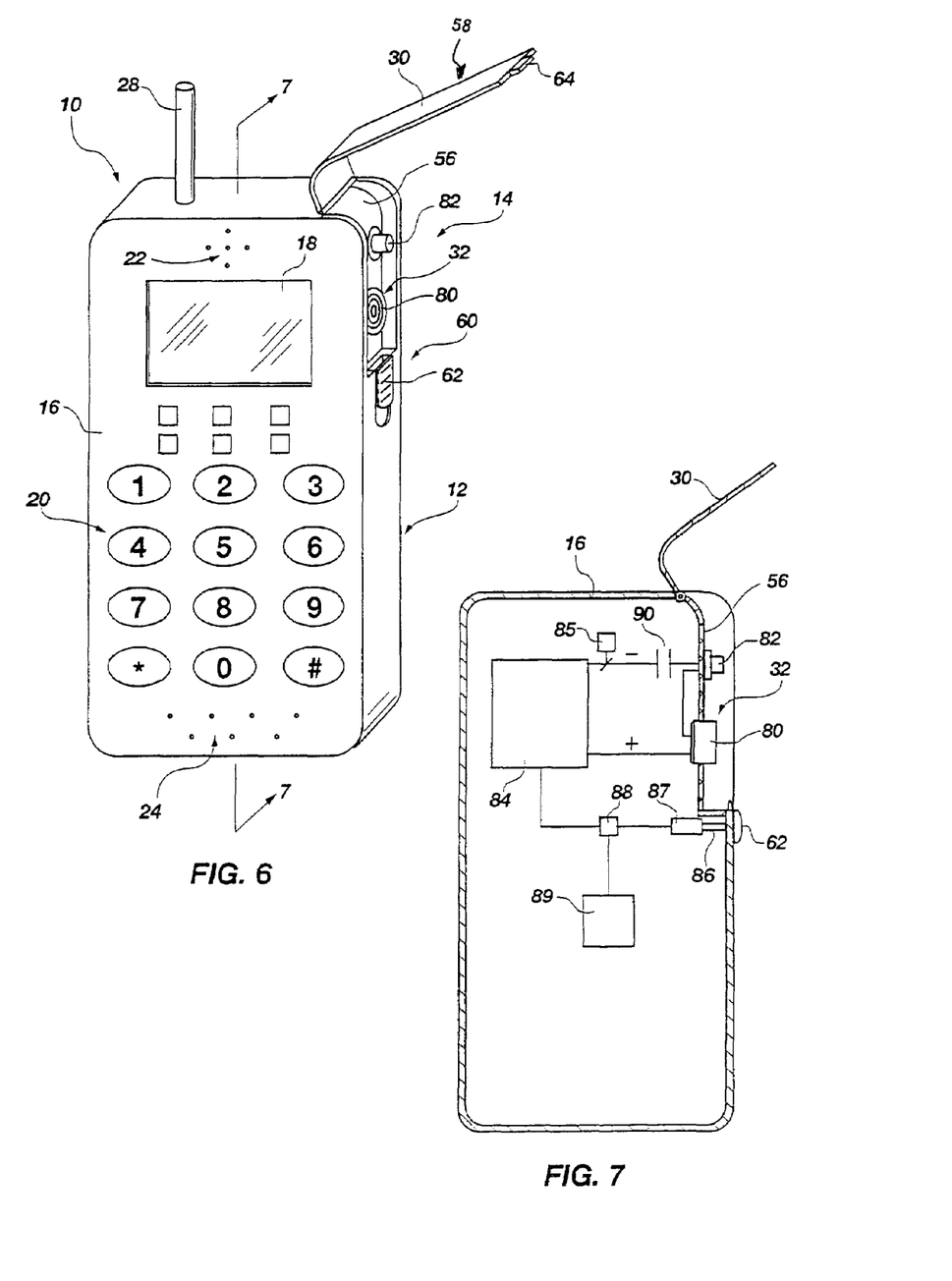
FIG. 6 is a perspective view of yet a fourth alternative embodiment of the present invention.
FIG. 7 is a view in longitudinal cross section of the embodiment of the invention shown in FIG. 6, taken at line 7-7.

FIGS. 6 and 7 illustrate a fourth alternative embodiment of the invention where the heat source 32 is an electric heating element 80, similar to the type of heating element typically used in vehicles. In the embodiment illustrated in FIGS. 6 and 7, the heating element 80 is heated by the continuous depression of an ignition button 82 that initiates a flow of electricity to the heating element 80. As more clearly shown in FIG. 7, the heating element 80 is electrically wired to a battery source 84 and is wired to the ignition button 82. The ignition button 82 is also wired to the battery source 84. Thus, when the ignition button 82 is depressed, a circuit is closed whereby electricity is provided to the heating element 80. The ignitor device 14 of this embodiment may preferably be structured in a suitable manner to open the circuit after an elapsed time to stop electricity from going to the heating element 80. In the simplest manner, this may be accomplished by releasing the ignition button 82 to open the circuit. Other electronic means well-known to those of skill in the art may be supplied to provide a similar assurance that the circuit will be opened to cease heating of the heating element 80, such as by an electronic timing element 85 shown schematically.

The embodiment of the device shown in FIG. 7 may also preferably be structured with a capacitor 90 having sufficient capacity to provide a charge to the heating element 80 such that if the communications device 14 should become inoperable (e.g., the battery becoming discharged), the ignitor device 14 may still be used in an emergency situation.

As with the other described embodiments, the embodiment illustrated in FIGS. 6 and 7 includes a heat plate 56 that protects the housing 16 and internal structures of the communications device 12 from extreme heat. Also, as described with the prior embodiments, the alternative embodiment is provided with a safety mechanism 58, here shown as a cover 30, that shields the heat source 32 and prevents unintended ignition of the heating element 80. This safety mechanism 58 also includes a locking mechanism 60, here shown as a latching button 62 that engages a member 64 of the cover 30, as previously described.

FIG. 7 illustrates more clearly a security locking feature that may be employed with the locking mechanism 60 where a mechanical structure, such as a slidable pin 86 engages the latching button 62 to prevent it from being moved. The slidable pin 86 is associated with a solenoid 87 which is wired to a switch 88. The switch 88 is in turn wired to the battery source 84 and to a microprocessor 89. Thus, a pre-programmable code may be entered into the keypad 20 of the communications device 12 to cause the mircoprocessor 89 to activate the switch 88, which in turn provides flow of power from the battery source 84 to the solenoid 87 to move the pin 86 out of engagement with the latching button 62, thereby allowing the cover 30 to open and access be had to the heat source 32. When the cover 30 is closed again and secured by the latching button 62, the slidable pin 86 will mechanically engage the latching button 62 once again to prevent unintended or unauthorized access to the heat source 32. The same feature may be provided by a voice command as previously described. Again, it would be preferable to provide a manual override mechanism to allow the ignitor device 14 to be used in situations where the communications device 12 (e.g., battery or software failure) becomes inoperable.

Figure 8:
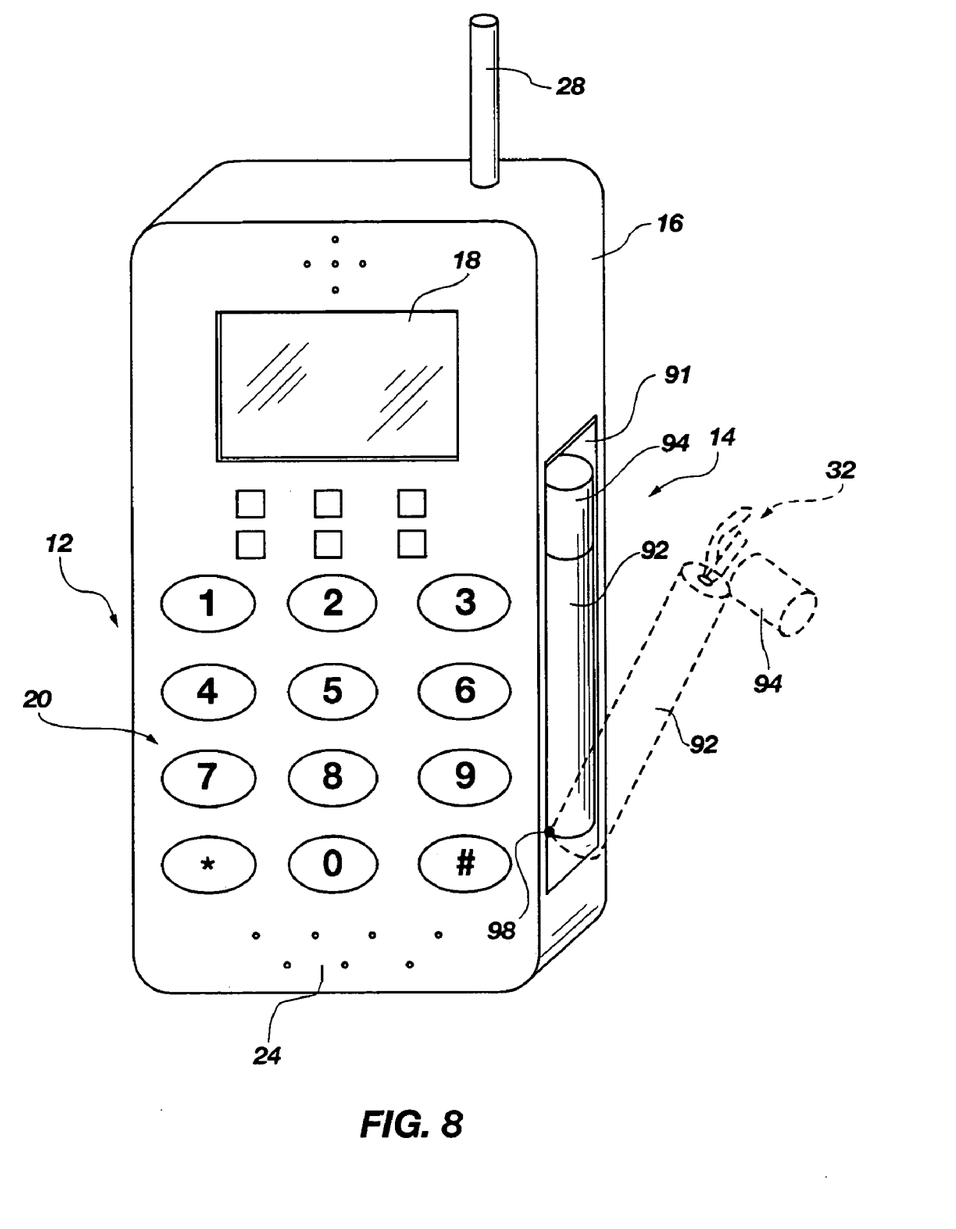
FIG. 8 is a perspective view of a fifth alternative embodiment of the present invention.

FIG. 8 illustrates a fifth embodiment of the invention where the ignitor device 14 is integrally formed as a part of the housing 16, but is not secured within the housing as described with the previous embodiments. That is, the ignitor device 14 may be a unit that is, for example, cradled within a channel 91 formed in the housing 16 of the device to position it an unobstructive placement relative to the communications device 12. The ignitor device 14 may be detachably attached to the housing 16 by any suitable means, such as a bracket (not shown) positioned within the channel 91 and sized to retain the ignitor device 14. Alternatively, the ignitor device 14 may be permanently attached to the housing 16, but otherwise accessible as necessary.

By way of example only, the ignitor device 14 is shown in FIG. 8 as being pivotally secured within the channel 91 so that the ignitor device 14 can be accessed more readily. Again, by example only, the ignitor device 14 may include a housing 92 that retains a fuel reservoir (not shown), and from which the heat source 32 (here shown as a flame) can be accessed. A moveable lid 94 may be made a part of the housing 92 to enclose the heat source 32. Thus, in use, the ignitor device 14 is rotated about pin 98 to release the ignitor device 14 from the channel 91 so that the device can be safely operated for providing a heat source 32.

The mobile communications and ignitor device of the present invention is designed to provide a ready heat source for igniting flammable items, such as cigarettes or kindling, as previously described. The device of the present invention may be configured in any number of ways to provide a mobile communications device in conjunction with a safely usable ignitor device, and may include any number of other types of communications devices. Thus, reference herein to details of the invention or the illustrated embodiments is by way of example only and not by way of limitation.

What is claimed is:

1. A mobile communications and ignitor device, comprising:
    a mobile communications device for contacting other persons or communications devices by wireless connections systems with said mobile communications device, said mobile communications device having a housing;
    an ignitor device structurally formed for inseparable retention within said housing for providing a permanently available heat source inseparably connected to said mobile communications device for the ignition of flammable elements; and a safety mechanism interlinked between said ignitor device and said mobile communications device to selectively prevent enablement of said ignitor device when said mobile communications device is in use for receiving communications.

2. The mobile communications and ignitor device of claim 1 wherein said safety mechanism comprises a movable cover attached to said housing for covering said heating element and a locking mechanism for selectively preventing the movement of said cover.

3. The mobile communications and ignitor device of claim 2 wherein said locking mechanism is mechanically-enabled and disabled.

4. The mobile communications and ignitor device of claim 3 wherein said locking mechanism is disabled by an electronic code.

5. The mobile communications and ignitor device of claim 3 wherein said locking mechanism is disabled by a voice command.

6. The mobile communications and ignitor device of claim 1 further comprising a programmable security code for enabling and disabling said safety mechanism.

7. The mobile communications and ignitor device of claim 1 wherein said mobile communications device includes a telephone for receiving and sending voice telephonic communications.

8. The mobile communications and ignitor device of claim 1 wherein said mobile communications device includes a personal digital assistant device.

9. The mobile communications and ignitor device of claim 1 wherein said ignitor device comprises ignition elements retained within said housing of said mobile communications device.

10. The mobile communications and ignitor device of claim 9 wherein said heat source is a flame and said ignition elements of said ignitor device comprise a fuel reservoir positioned within said housing.

11. The mobile communications and ignitor device of claim 10 wherein said ignition elements are secured to said housing and said fuel reservoir is refillable with fuel.

12. The mobile communications and ignitor device of claim 10 wherein said ignition elements are inseparably secured to said housing of said mobile communications device and said fuel reservoir is removable from said housing for replacement.

13. The mobile communications and ignitor device of claim 10 wherein said ignition elements further comprise a friction wheel and flint.

14. The mobile communications and ignitor device of claim 10 wherein said ignition elements further comprise an electrical sparking member.

15. The mobile communications and ignitor device of claim 14 wherein said electrical sparking member is enabled by a means selected from the group comprising implementation of a programmed code and programmed voice command code.

16. The mobile communications and ignitor device of claim 9 wherein said heat source is an electric heating element.

17. The mobile communications and ignitor device of claim 16 wherein the heating of said electric heating element is initiated by a depressible switch.

18. The mobile communications and ignitor device of claim 16 wherein the heating of said electric heating element is initiated by a means selected from the group comprising implementation of a programmed code and programmed voice command code.

* * * * *